United States Patent [19]  [11] 3,884,897
Geiger et al.  [45] May 20, 1975

[54] PROCESS FOR THE MANUFACTURE OF INSULIN, ANALOGS AND DERIVATIVES THEREOF

[75] Inventors: Rolf Geiger, Frankfurt am Main; Hans Wissmann, Bad Soden, Taunus; Dietrich Langner, Frankfurt am Main, all of Germany

[73] Assignee: Hoechst Aktiengesellschaft, Frankfurt am Main, Germany

[22] Filed: Oct. 29, 1973

[21] Appl. No.: 410,312

[30] Foreign Application Priority Data
Oct. 31, 1972 Germany............................ 2253297

[52] U.S. Cl. .............................................. 260/112.7
[51] Int. Cl. ........................ C07c 103/52; C08h 1/00
[58] Field of Search .................................. 260/112.7

[56] References Cited
UNITED STATES PATENTS
3,420,810   1/1969   Katsoyannis et al............. 260/112.7

OTHER PUBLICATIONS
Geiger et al.: Chem. Abstr. 72, 51040g (1970).

Primary Examiner—Lewis Gotts
Assistant Examiner—Reginald J. Suyat
Attorney, Agent, or Firm—Curtis, Morris & Safford

[57]   ABSTRACT
A method for making insulin and certain derivatives thereof from a compound of the formula(I)

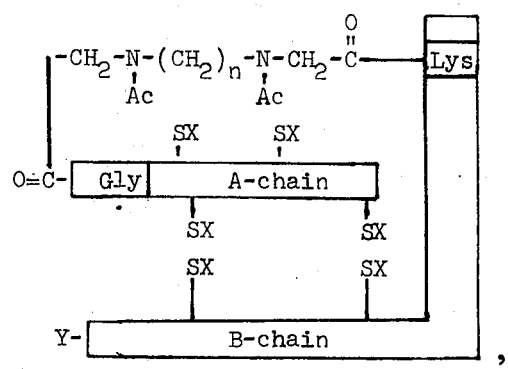

wherein Ac is an N-protective group removable by proton solvolysis X is hydrogen or an S-protective group, and $n$ is 2 or 3, which comprises solvolyzing the Ac groups and dehydrogenating the -SX groups to S—S bonds to form a compound of the formula (II)

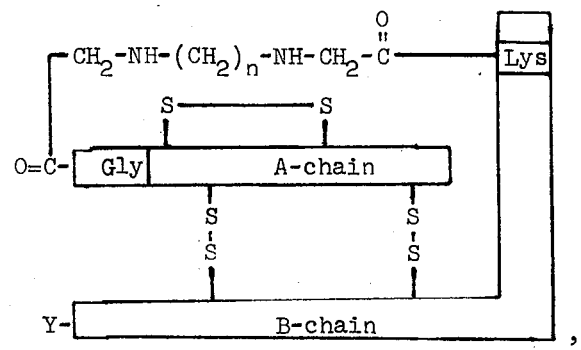

and then eliminating the

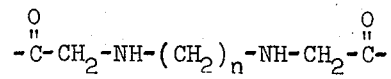

bridge by Edman degradation. Compounds of the formula II.

2 Claims, No Drawings

PROCESS FOR THE MANUFACTURE OF INSULIN, ANALOGS AND DERIVATIVES THEREOF

The present invention relates to a process for the manufacture of insulin, analogs and derivatives thereof, which comprises converting a compound of the formula I

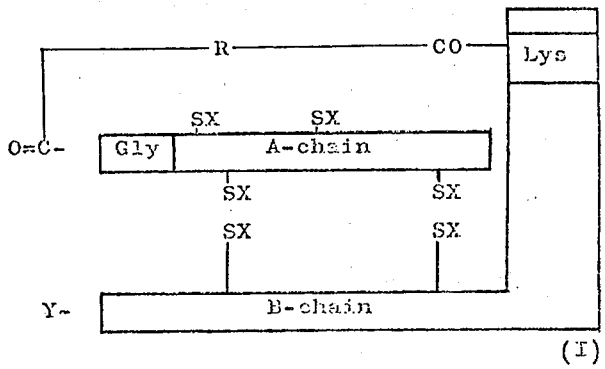

in which X stands for hydrogen or an S-protective group and Y stands for hydrogen, an alkanoyl group of 1 to 4 carbon atoms, a phenyl-alkanoyl group of 1 to 3 carbon atoms in the alkanoyl moiety, benzoyl or an alkyloxy-carbonyl or aralkyloxycarbonyl group, the alkyl moiety of which containing 1 to 4 carbon atoms, an amino-acyl group derived from naturally occurring α- or β-amino acids or from the D-enantiomers thereof, or an acylaminoacyl group and R stands for a radical of the general formula II

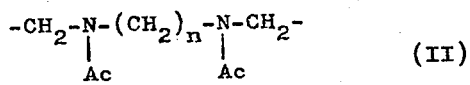

in which Ac stands for an N-protective group capable of being split off by proton solvolysis and $n$ stands for the integer of 2 or 3, by the splitting-off of Ac and X and dehydrogenation, into a compound of the general formula III

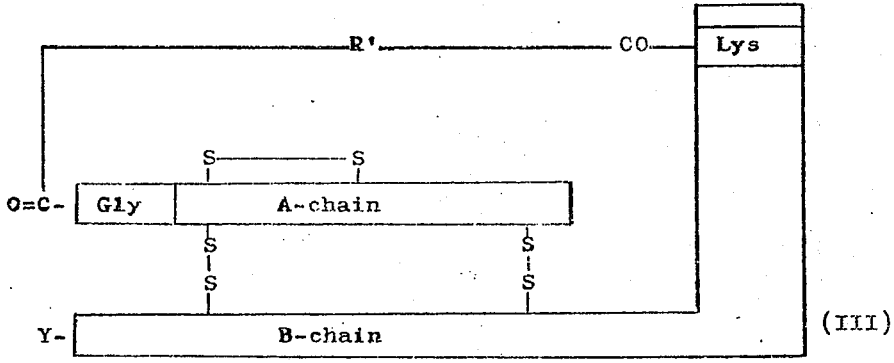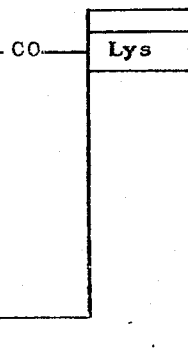

in which Y is defined as above and R' stands for the group —$CH_2$—NH—$(CH_2)_n$—NH—$CH_2$— where $n$ is defined as above, and eliminating the —CO—R'—CO—bridge from this compound by Edman degradation.

This invention moreover relates to compounds of the general formula III, in which Y and R' are defined as above.

As disclosed in copending U.S. Pat. application Ser. No. 408,913, filed Oct. 23, 1973 and incorporated herein by reference, as S-protective groups X, there are used radicals which are already known, for example the trityl, diphenylmethyl, acetamidomethyl or tetrahydropyranyl radical, moreover alkylmercapto groups, such as ethylmercapto, isopropylmercapto or tert.-butylmercapto groups, and aminoethyl-carbamoyl protective groups according to German Offenlegungsschrift No. 1,930,330; furthermore, the ethyl-carbamoyl radical. Even the sulfo group may temporarily serve for the protection of SH-groups; it is, for example, eliminated by the action of excess mercapto compounds. The sulfo group is preferably used as the protective group X in the starting substances of the formula I, whereas the other above-cited groups for X are preferably mentioned for the precursors of the synthesis of the starting substances of formula I.

The starting compounds used for the bifunctional bridge HOOC—R'—COOH, wherein R' stands for the group —$CH_2$—NH—$(CH_2)_n$—NH—$CH_2$—, in which $n$ stands for 2 or 3, are known.

As taught in said copending U.S. patent application, for a temporary masking of the NH-groups, acyl radicals Ac are used. Ac may stand for an amino protective group usual in peptide chemistry; radicals which are capable of being split off by proton solvolysis are preferably used, in particular the tert.-butyloxy-carbonyl radical (Boc).

According to the present invention for the linking of the A- and B-chains of insulin, for example a 4-nitrophenyl ester of the formula

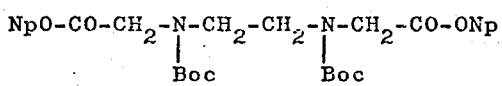

is reacted, as disclosed in said copending U.S. patent application, as an activated ester with an insulin A-chain sulfonate prepared according to known methods. Suitable solvents are dimethyl formamide or dimethyl sulfoxide. The reaction product is precipitated using an organic solvent such as an ether or ethyl acetate, whereupon an intermediate product of the formula

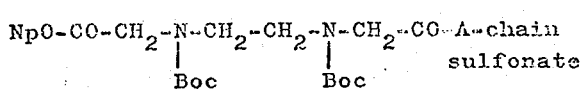

is accordingly obtained. The reaction product is a sparingly soluble compound of the formula I, wherein X stands for $SO_3$, R for —$CH_2$—N(Boc)—$CH_2$—$CH_2$—N(Boc)—$CH_2$— and Y for Boc-Gly.

As taught in the aforementioned copending U.S. patent application, this product is again dissolved, preferably in dimethylformamide, phosphoric acid tris-dimethylamide or dimethylsulfoxide, and the solution is reacted with an about equimolar amount of B-chain sulfonate in the presence of an amount of N-ethyl-morpholine or triethylamine which is sufficient for the neutralization of the acid groups, at a pH-value of from about 8 to 10, and of about 1 equivalent of 1-hydroxybenzotriazole. The ε-amino group in $Lys^{B29}$ of the B-chain used is free, the α-amino group of $Phe^{B1}$ may be protected, for example by means of a Boc-Gly, Boc-Ala or TFA radical.

The above-cited combination of the A- and B-chains may also be carried out in an inverse order of succession.

Subsequently, the Boc-groups are split off by treating the product for 30 to 60 minutes with trifluoroacetic acid, the reaction product is precipitated with ether and the dried substance is taken up, optionally after purification by chromatography, in 8-M urea or water of pH 5 to 9. Under a nitrogen atmosphere, a 10- to 500-fold excess of thioglycol or the 1- to 5-fold calculated amount of a trialkyl-phosphine, for example tributyl-phosphine, is added at 0° to 60°C, the product is precipitated with a mixture of acetone in acetic acid after a reaction time of about 4 to 6 hours at room temperature, it is centrifuged and washed several times with a mixture of acetone and acetic acid. The product is then dissolved in the smallest possible amount of aqueous $NH_3$, the solution is diluted with 0.05M $(NH_4)HCO_3$, the pH of which is adjusted to 10–10.6, until a peptide concentration of 0.01 to 1 mg/ml is reached, and stirred overnight at 0°–20°C in a slow air stream. The pH-value chosen may also be lower, for example 8 to 10, but the reaction times required are then longer, for example up to about 150 hours. The pH-value is then adjusted to 4 to 5.5 by means of 1N acetic acid and the solution is lyophilized or evaporated to dryness in vacuo. Purification, Edman degradation and isolation of the insulins are carried out as disclosed in the cited copending Patent Application.

Namely, for purification purposes the product is chromatographed in 1N to 2N acetic acid by means of "Sephadex G 50" or "G 75" in a column having a length of 1 to 2 meters. The "insulin" peak (up to 50 %) is processed in the following manner, the product that has been combined in the wrong way (up to about 30 %) is recycled, after reduction, to a recombination.

The cross-linked crude insulin of the general formula III is taken up in about 20 times the amount of 95 percent pyridine. After filtration, the solution is reacted with 8 to 16 mols of phenyl-isothiocyanate during about 1 hour at about 10° to 30°C., part of the solvent is distilled off in vacuo, the mixture is precipitated with ether, the operation is repeated and the precipitate is then allowed to stand for about 2 hours with 5 to 10 times its amount of trifluoroacetic acid at about 25°C. The crude insulin is precipitated with ether, chromatographed in 1N to 2N acetic acid via a column charged with Sephadex G-50 or G-75 and having a length of 1 to 2 meters, and then directly precipitated in usual manner from the solution with an addition of Zn ions at about pH 5.4 to 5.5, and crystallized where required. The yield of crystallized material is 15 to about 30 percent of the theoretical yield (excluding material which, if combined in the wrong way, has to be reduced once more.)

If the B-chain ends in an N-terminal phenylalanine (Y"H), des-Phe$^{B1}$ insulin is obtained upon elimination of the —CO—R'—CO— bridge by means of Edman degradation [cf. for ex. Acta Chem. Scand. 238–293 (1950)] with simultaneous splitting-off of the N-terminal Phe. If Phe is to be preserved, a B-chain is prepared in which Y stands for an aminoacyl group, for example Gly or Ala, which is eliminated by Edman degradation. Y may also stand for an easily eliminable acyl group, for example the trifluoroacetyl group (TFA), which is split off, for example by means of dilute NaOH, 0.1M piperidine or 1N $NH_3$, once the insulin synthesis is complete; furthermore, for another acyl radical according to German Offenlegungsschrift No. 2,042,299, which is preserved upon synthesis and yields a corresponding insulin derivative.

Instead of the solid phase method used in the following Examples for the synthesis of the A- and B-chains, the known methods of fragment condensation, for example the carbodiimide method, where required, with the addition of N-hydroxy-succinimide, 1-hydroxy-benzotriazoles, 3-hydroxy-3-oxo-3,4-dihydro-1,2,3-benzotriazine or the azide method, may also be applied according to this invention for the preparation of the A- and B-chains used as starting material.

As taught for the process in copending U.S. Pat. application Ser. No. 408,913, in addition to insulin itself, the process of the present invention also allows insulin analogs and derivatives to be prepared.

By insulin analogs there are understood compounds in which one or more amino acids have been exchanged against other, preferably simpler, amino acids, furthermore insulins having a modified, preferably shortened, chain length.

For example, as already known in the art, in the Achain $Gln^5$ and $Gln^{15}$ may be replaced by Glu, $Ser^{12}$, $Tyr^{14}$, $Asn^{18}$ and $Asn^{21}$ by Ala, $Val^{10}$ by Leu or another hydrophobic amino acid, furthermore $Tyr^{19}$ by Phe.

In the B-chain, $Phe^1$, $Val^2$, $Asn^3$, $Gln^4$, $His^5$, $Ser^9$, $His^{10}$, $Thr^{27}$ and $Pro^{28}$ may be replaced by simpler amino acids, preferably alanine. The amino acid 1 to 3 and 30 may also be eliminated. Even $Cys^{A7}$ and $Cys^{B7}$ may be replaced by Ala.

Amino acid derivatives are understood to be compounds carrying substituted functional groups. For example, the α-amino group of the B-chain may be substituted by an acyl group in a manner analogous to German Offenlegungsschrift No. 2,042,299. The same applies to the above-defined insulin analogs, always provided that the replacement or substitution does not, or only to a minor extent, decrease the biological activity of the insulins.

The following Examples illustrate the invention.

EXAMPLE 1

Bovine insulin a. A-chain S-tetrasulfonate (cattle)

This compound was prepared as disclosed in copending Patent Application Ser. No. 408,913, Example 1 a.

Namely, the bovine insulin A-chain was prepared according to Hoppe Seyler's Z. Physiol. Chem. 352, 419–429 (1971) following the solid phase method and starting from polystyrene resin with a cross-linking rate of 1 %. The first amino acid, namely asparagine, was esterified as Boc-Asn(Mbh)—OH (prepared from H—Asn(Mbh)—OH [cf. Chem. Ber. 103, 2041–2051 (1970)] using Boc azide) with the hydroxy groups of the resin in known manner.

All the following amino acids were used as Boc amino acid 4-nitro-phenyl esters. Carboxyl groups in the side chains were present as benzyl esters, hydroxy groups of serine and tyrosine as benzyl ethers. The SH-group of cystein was protected by the S-tert.-butylmercapto group [cf. Peptides 1969, North Holland Publishing Comp., Amsterdam (1971), page 30].

Each condensation step was performed in the presence of 1-hydroxy-benzotriazole in a manner described in "Chemistry and Biology of Peptides" (1972), page 343, in order to increase reaction speed and specificity.

When the synthesis was complete, the A-chain was split off from the resin in known manner by means of hydrogen fluoride and converted by sulfitolysis of the asymmetric disulfides according to Hoppe Seyler's Z-Physiol. Chem. 352, 419–429 (1971) into the S-tetrasulfonate and then purified. The A-chain sulfonate prepared in this manner and purified (yield of synthesis 65 %, yield of sulfitolysis 28 %) could not be distinguished by electrophoresis from a compound prepared from natural insulin.

b. $N^\alpha$-Boc-Ala-B-chain S-disulfonate or $N^\alpha$-Boc-Gly-B-chain S-disulfonate These compounds were also prepared as disclosed in the copending Patent Application, Example 1 b.

Namely, the bovine insulin B-chain was prepared according to Hoppe Seyler's Z. Physiol. Chemie 348, 1335 (1967) and 352, 419 (1971), according to Merrifield, Biochemistry 3, 1385 (1964), starting from polystyrene resin with a cross-linking rate 1 percent. Lysine was used as Boc—Lys(Pht)—ONp, all the other amino acids likewise as Boc-nitrophenyl esters, further carboxy groups in the side chains were present as benzyl esters according to the Merrifield method, hydroxy groups of serine and tyrosine as benzyl ethers. The SH-group of cystein was protected by means of the S-tert.-butylmercapto group [cf. Peptides 1969, North Holland Publishing Comp., Amsterdam (1971), page 30].

Each condensation step was performed in the presence of 1-hydroxy-benzotriazole in order to increase reaction speed and specificity.

When the synthesis was complete, the B-chain was split off from the resin in known manner by means of hydrogen fluoride. Yield: 55 percent, calculated on the first amino acid $Ala^{B30}$. 3.6 grams (1 mmol) of the $N^{\epsilon B29}$-Pht-B-chain still S-protected were then reacted in 100 ml of dimethylformamide with 390 mg (1.2 mmols) of Boc-Ala-ONp during 1 hour at room temperature in the presence of 135 mg of 1-hydroxy-benzotriazole. After the solvent had been distilled off in vacuo until a volume of 10 ml was reached and, after ethyl acetate had been added, 3.5 g of Boc-Ala-S-tert.-butylmercapto-$N^\epsilon$-Pht-B-chain were obtained. For splitting off the phthaloyl group, the compound was dissolved in 100 ml of 80 percent phenol and, after addition of 4 ml of hydrazine hydrate, the solution was heated to 40°C. for 16 hours. Subsequently, 3.3 g of the compound that had been freed from the phthaloyl group were precipitated by means of 1 l of isopropanol - ether (1 + 5). The compound was converted into the disulfonate according to Example 1 (a); yield: 3.0 g.

In a corresponding manner, the $N^\alpha$ -Boc-Gly-B-chain S-disulfonate was prepared.

c. Preparation of the bridging reagents
(1). N,N'-di-Boc-ethylene-diamine-N,N'-diacetic acid 8.8 Grams of ethylene-diamine-N,N'-diacetic acid were dissolved in 60 ml of dioxan and 50 ml of water. 28 Milliliters of triethylamine and 21 ml of Boc-azide were added and the mixture was vigorously stirred at 50°C for 24 hours (after 21 hours, another 14 ml of triethylamine were added).

The mixture was then concentrated to a small volume, acidified at 0°C with a KHSO₄-solution, extracted with ethyl acetate, the ethyl acetate phase was washed with water, dried over NaSO₄ and the ethyl acetate was distilled off in vacuo. The residue was recrystallized from ethyl acetate. Yield: 12.8 g, m.p. 156°–157°C.

2. N,N'-di-Boc-ethylene-diamine-N,N'-diacetic acid bis-N-hydroxysuccinimide ester 3.7 Grams of an acid and 2.3 g of HONSu were dissolved in 100 ml of dioxan. At room temperature, 5.3 g of DCC\*⁾ were added and the mixture was stirred overnight. The precipitate (9.5 g) was suction-filtered and extracted several times with hot acetonitrile. The compound which had precipitated on cooling was recrystallized twice from acetonitrile/methanol. Yield: 3.5 g, m.p. 216° to 217°C (decomposition).

\*⁾ DCC = dicyclohexyl carbodiimide

3. N,N'-di-Boc-ethylene-diamine-N,N'-diacetic acid bis-4-nitrophenyl ester 3.7 Grams of an acid and 3.2 g of 4-nitrophenol were dissolved in 100 ml of dioxan. 5.3 Grams of DCC were added, the mixture was stirred overnight, urea was separated by filtration, the solvent was evaporated in vacuo and the oily residue was twice dissolved and precipitated from diisopropyl ether/petrol ether. The product was purified by recrystalization from isopropanol. Yield: 3.5 g, m.p. 131° to 133°C.

4. N,N'-di-Boc-propylene-diamine-N,N'-diacetic acid bis-4-nitrophenyl ester

The di-Boc compound prepared according to Example 1 (c) (Yield: 72 %, m.p. 148°–151°C) was used to prepare the bis-4-nitrophenyl ester as in Example 1 c. Yield: 68 %, m.p. 126°–128°C.

5. Bovine insulin

The pH-value of a solution of 2.8 g of the A-chain tetrasulfonate prepared according to (a) in 100 to 300 ml of dimethylsulfoxide was adjusted to 9 by adding N-ethyl-morpholine and the mixture was stirred with 1.8 g of the nitrophenyl ester prepared according to Example 1 (c,3). After 20 hours, the mixture was precipitated with ether/methanol (10:1), 2.6 g of mono-A-chain tetrasulfonate of di-Boc-ethylene-diamine-diacetic acid mononitrophenyl ester (87 %) were obtained. This compound was again taken up in 100 to 300 ml of dimethylsulfoxide, 3.0 g of the $N^\alpha$-Boc-Ala-(or Gly)B-chain disulfonate prepared according to Example 1 (b), 120 g of 1-hydroxy-benzotriazole and some triethylamine (up to pH 9) were added and the mixture was stirred for 6 hours at room temperature. It was then precipitated with ether/methanol (10:1). Yield: 5.45 g. The crude reaction product was taken up in 40 ml of trifluoroacetic acid. After 40 minutes, 5.0 g of the compound of the general formula I, wherein R is

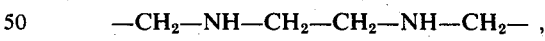
—CH₂—NH—CH₂—CH₂—NH—CH₂— ,

X is $SO_3^-$ and Y is Gly, were precipitated with 400 ml of ether. After chromatography by means of a column containing Sephadex G 50 (column size: length 4 m, diameter: 4 cm) in 0.05 M $(NH_4)HCO_3$ buffer of pH 8.5 to 9 and lyophilization, the product (3.3 g) was taken up in 0.25 l of water of pH 8.6. 50 Milliliters of thioglycol were added, the mixture was stored for 6 hours under nitrogen, precipitated with the 10- to 20-fold amount of a mixture of acetone in acetic acid, centrifuged and freed from thioglycol by washing it with a mixture of acetone in acetic acid. The product was then dissolved in a small amount of 1N $NH_3$ and diluted to a volume of 25 l, the pH-value was adjusted to 9 by means of 1N $NH_3$, stirring was continued for about 100 hours in a weak air stream at room temperature, the pH-value was adjusted to about 4 to 5 by means of acetic acid, and the solution was lyophilized.

The residue was dissolved in 50 ml of 10 percent acetic acid or formic acid and chromatographed by means of a column having the size 4 × 200 cm and containing Sephadex G-50 or G-75, fine. Distribution chromatography using Sephadex LH-20 in a system of n-butanol/acetic acid/water (2:1:10) also allowed good purification (column size 4 × 100 or 4 × 200 cm). The columns had been calibrated with insulin. After a preliminary peak (0.3 g) the peak of the cross-linked insulin appeared (2.6 g). The preliminary peak was reduced, according to J. Amer. Chem. Soc. 93 (1971), page 3080, using 1,4-dithio-threitol in liquid ammonia or tributyl-phosphine in dilute aqueous ammonia at pH 8 to 10 and oxidized as above in water at pH 9.

The 2.8 g of cross-linked crude insulin obtained upon chromatography were stirred in 60 ml of 95 percent pyridine twice for 1 hour at 40°C with 0.7 ml of phenyl-isothiocyanate. The pyridine was concentrated to a volume of 10 ml. By adding ether, 2.45 g of phenyl-thiocarbamoyl compound precipitated. After drying, it was stored for 2 hours at 25°C in 20 ml of trifluoroacetic acid. 2.2 Grams of crude insulin were precipitated with 200 ml of ether.

After another purification operation by chromatography on Sephadex G-75 as above, an insulin fraction was obtained which precipitated in an amorphous form in the usual manner after addition of $ZnCl_2$ and adjustment of the pH to 5.4 but crystallized in the course of 1 to 2 days. The crystals were cautiously separated from uncrystallized material by centrifuging, crystallization was repeated and 1.2 g (20 %, calculated on A-chain material used) were obtained, comprising 23 to 24 I.U. per mg.

EXAMPLE 2

Des-(Phe-Val)$^{B1-2}$-des-Ala$^{B30}$-[Ala$^{412,14,18,21}$]-insulin (pig)

a. Ala$^{12,14,18,21}$-insulin A-chain S-tetrasulfonate (pig) and b. N$^\alpha$-Boc-des-Phe$^{B1}$-des-Ala$^{B30}$-insulin B-chain S-disulfonate (pig)

were prepared as disclosed in the copending Patent Application cited above, Example 2 (a) and (b).

Namely, in a manner analogous to Example 1 a, a pig's insulin A-chain was prepared according to the solid phase method, Boc-Ala-OH being esterified as the first amino acid (A 21) with the hydroxy groups of the resin. In the positions 18, 14 and 12, Boc-Ala-ONp groups were introduced instead of amino acids that hold these positions in the natural chain. The further course of synthesis and the work-up were the same as disclosed in Example 1 a. Yield of synthesized material: 69 percent, that obtained by sulfitolysis: 34 percent.

The bovine insulin-B-chain was prepared in a manner analogous to Hoppe Seyler's Z. Physiol. Chemie 348, 1355 (1967) and 352, 419 (1971), according to Merrifield, Biochemistry 3, 1358 (1964), starting from polystyrene resin with a cross-linking rate of 1 percent. Lysine was used as Boc-Lys(Pht)-ONp, all the other amino acids also as Boc-nitro-phenyl esters, further carboxy groups in the side chains were present as benzyl esters according to Merrifield, hydroxy groups of serine and tyrosine as benzyl ethers. The SH-group of serine and tyrosine as benzyl ethers. The SH-group of serine was protected by means of the S-tert.-butylmercapto group [cf. Peptides 1969, North Holland Publishing Comp., Amsterdam, (1971), page 30]. The synthesis ended with Boc-Val-ONp$^{(B2)}$.

Each condensation step was performed in the presence of 1-hydroxy-benzotriazole.

When the reaction was complete, the B-chain was split off in known manner from the resin with hydrogen fluoride. Yield: 55 percent, calculated on the first amino acid Ala$^{B30}$.

c. Des-(Phe-Val)$^{B1-2}$-des-Ala$^{B30}$-[Ala$^{412,14,18,21}$]-insulin(pig)

The pH-value of a solution of 2.8 g of the A-chain tetrasulfonate prepared according to a in 200 ml of dimethylsulfoxide was adjusted to 9 by adding N-ethylmorpholine and the mixture was stirred with 1.8 g of the nitrophenyl ester prepared according to Example 1 (c,3). After 20 hours, the mixture was precipitated with ether/methanol (1:10). 2.6 Grams of mono-A-chain tetrasulfonate of di-Boc-ethylene-diamine-diacetic acid mononitrophenyl ester (87 %) were obtained. The product was taken up in 200 ml of dimethylsulfoxide, 3.0 g of the B-chain disulfonate prepared according to Example 2 (b), 120 g of 1-hydroxy-benzotriazole and some triethylamine (up to a pH of 9) were added and the mixture was stirred for 6 hours at room temperature. The mixture was then precipitated with ether/methanol (1:10): Yield 5.3 g. The crude reaction product was taken up in 40 ml of trifluoroacetic acid. After 40 minutes, the solution was precipitated with 400 ml of ether and 4.9 g of the compound of the general formula I, wherein R is

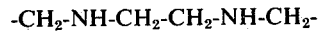
-CH$_2$-NH-CH$_2$-CH$_2$-NH-CH$_2$-

X is SO$_3^-$, Y is H and a B-chain shortened by B$^{1-3}$ and B$^{30}$ were obtained.

The product was taken up in 0.25 l of water of pH 8.6. 50 Milliliters of thioglycol were added, the mixture was stored for 1 hour under nitrogen, heated for another hour to about 40°C, again cooled to about 20°C and extracted twice with 300 ml of ethyl acetate each. The ethyl acetate was separated, the remainder was expelled by a nitrogen stream. The mixture was then diluted to a volume of 25 liters and the pH was adjusted to 10 by means of 1N NaOH, the mixture was stirred for 18 hours at 10°C in a weak air stream, 1N HCl was added until a pH of 5.5 was reached, and the solution was lyophilized.

The residue was dissolved in 50 ml of 10 percent acetic acid and chromatographed by means of a column having a size of 4 × 100 cm and containing Sephadex 75, fine. The column was calibrated with cross-linked insulin. After a preliminary peak (0.38 g) the "insulin peak" appeared (2.86 g) after evaporation in vacuo. The preliminary peak was reduced as in Example 1 and oxidized in 1.5 l of water as above at pH 10.

The 2.86 g of cross-linked crude insulin derivative obtained upon chromatography were stirred in 60 ml of 95 percent pyridine for 3 hours at 26°C with 0.7 ml of phenyl-isothiocyanate. The pyridine was concentrated to a volume of 10 ml. By adding ether, 2.4 g of phenyl-thiocarbamoyl compound precipitated. After having been dried, it was stored for 2 hours at 25°C in 20 ml of trifluoroacetic acid. 2.2 Grams of crude insulin were precipitated with 200 ml of ether. After another purification operation by chromatography on Sephadex G-75 as above, an "insulin" fraction of 1.2 g (15 %), calculated on A-chain material used, was obtained, comprising about 20 I.U. per mg.

EXAMPLE 3

Des-phenylalanine$^{B1}$ insulin (cattle)

a. A-chain S-tetrasulfonate (cattle) and
b. N$^\alpha$-Boc-B-chain S-disulfonate (cattle)

were prepared as disclosed in the copending Patent Application cited above, Example 3 a and b.

Namely, the A-chain compound was prepared in a manner analogous to Z. Naturforschung 24b, 1127–1139 (1969), showing the improvements described in Hoppe Seyler's Z. Physiol. Chem. 352, 2 (1971). The protective groups were split off, also the S-trityl groups, by dissolving the peptide in trifluoroacetic acid and pouring the solution into water after 1 hour. After filtration and extraction with ether, the product was lyophilized and converted into S-tetrasulfonate in a manner analogous to Z. Naturforschung 24b, 1138 (1969).

Synthesis of the B-chain was carried out as in Example 1 b.

When the synthesis was complete, the B-chain was split off in known manner from the resin by means of hydrogen fluoride. Yield: 55 %, calculated on the first amino acid Ala$^{B30}$. 3.6 grams (1 mmol) of N$^\epsilon$-Pht-B-chain still S-protected were then reacted in 100 ml of dimethylformamide with 300 mg (1.2 mmols) of Boc-ONp in the presence of 135 mg of 1-hydroxybenzotriazole during 1 hour at room temperature. After the solvent had been distilled off in vacuo until a volume of 10 ml remained and ethyl acetate had been added, 3.5 g of N$^\alpha$-Boc-S-tert.-butylmercapto-N$^\epsilon$-Pht-B-chain were obtained.

For splitting off the phthaloyl group, the compound was dissolved in 100 ml of 80 percent phenol and, after addition of 4 ml of hydrazine hydrate, the mixture was heated to 40°C. for 16 hours. 3.3 grams of the compound that had been freed from the phthaloyl group were then precipitated with 1 l of isopropanol-ether (1 + 5) and converted into the disulfonate as in Example 1 a. Yield 3.0 g.

c. Des-Phe$^{B1}$-insulin (cattle)

The pH-value of a solution of 2.8 g of the A-chain tetrasulfonate prepared according to (a) in 200 ml of dimethylsulfoxide was adjusted to 9 by adding N-ethylmorpholine and the mixture was stirred with 1.8 g of the nitrophenyl ester prepared according to Example 1 (c, 3). After 20 hours, the mixture was precipitated with ether/methanol(1:10). 2.6 Grams of the mono-A-chain tetrasulfonate of di-Boc-ethylene diamine diacetic acid mononitrophenyl ester (87 %) were obtained. The product was again taken up in 200 ml of dimethylsulfoxide, 3.0 g of the N$^\alpha$-Boc-B-chain disulfonate prepared according to Example 1 (b), 120 mg of 1-hydroxybenzotriazole and some triethylamine (up to pH 9) were added, and the mixture was stirred for 6 hours at room temperature. It was then precipitated with ether/methanol (1:10). Yield: 5.45 g. The crude reaction product was taken up in 40 ml of trifluoroacetic acid. After 40 minutes, 5.0 g of the compound of the general formula I, wherein R is —CH$_2$—NH—CH$_2$— CH$_2$—NH—CH$_2$—, X is SO$_3^-$ and Y is H, were precipitated with 400 ml of ether. The product was purified, reduced and dehydrogenated to yield insulin in a manner analogous to Example 1.

The residue was dissolved in 50 ml of 10 percent acetic acid and chromatographed by means of a column (size 4 × 100 cm) containing Sephadex G-75, fine. The column had been calibrated with cross-linked insulin. After a preliminary peak (0.36 g), the insulin peak (3.2 g) appeared. The preliminary peak was reduced as in Example 1 and oxidized in 1.5 l of water as above. The 3.2 g of cross-linked crude insulin obtained upon chromatography were subjected to the Edman degradation as in Example 1. 2.55 Grams of crude des-Phe$^{B1}$-bovine insulin were obtained.

After another purification operation by chromatography on Sephadex G-75 as above, an insulin fraction was obtained which precipitated in an amorphous form in the usual manner after addition of ZnCl$_2$ and adjustment of the pH to 5.4 but crystallized in the course of 1 to 2 days. The crystals were cautiously separated from uncrystallized material by centrifuging, crystallization was repeated and 1.22 g of des-Phe$^{B1}$ insulin (cattle) were obtained (20 %, calculated on A-chain used), comprising 23 to 24 I.U. per mg.

EXAMPLE 4

B1-acetyl insulin (pig)

a. A-chain S-tetrasulfonate (pig) and
b. B1-acetyl-B-chain S-disulfonate were prepared as disclosed in the copending Patent Application cited above, Example 4 (a) and (b).

Namely, for the A-chain compound the preparation was analogous to Example 1 a, the amino acid sequence of the pig's insulin A-chain being taken into regard. Yield upon synthesis: 68 percent, upon sulfitolysis: 32 percent.

For the B-chain compound, the chain was synthesized in a manner analogous to Example 1 b using, however, Lys as Z-(Cl) and Phe$^{B1}$ as N-acetyl-Phe-ONp. Boc-Lys-ONp When the synthesis was complete, the B-chain was split off in known manner from the resin by means of hydrogen fluoride. Yield: 59 %, calculated on the first amino acid Ala$^{B30}$. The substance was converted into the disulfonate as in Example 1 a.

c. B1-acetyl-insulin (pig)

The pH-value of a solution of 2.8 g of the A-chain tetrasulfonate prepared according to a in 200 ml of dimethylsulfoxide was adjusted to 9 by adding N-ethylmorpholine, and the mixture was stirred with 1.8 g of the nitrophenyl ester prepared according to Example 1 (c,3). After 20 hours, the mixture was precipitated with ether/methanol (10:1), whereupon 2.6 g of mono-A-chain tetrasulfonate of di-Boc-ethylene-diamine diacetic acid mononitrophenyl ester (87 %) were obtained. This product was again taken up in 200 ml of dimethylsulfoxide, 3.0 g of the N-acetyl-B-chain disulfonate obtained according to (b), 120 mg of 1-hydroxy-benzotriazole and some triethylamine (up to a pH of 9) were added and the mixture was stirred for 6 hours at room temperature. The mixture was then precipitated with ether/methanol (10:1) and a yield of 5.45 g was obtained. The crude reaction product was taken up in 40 ml of trifluoroacetic acid. After 40 minutes, 5.06 g of the compound of the general formula I, wherein R is —CH$_2$—NH—CH$_2$—CH$_2$—NH—CH$_2$—, X is SO$_3$ and Y is acetyl, were precipitated with 400 ml of ether.

The product was worked up as disclosed in the copending Patent Application cited above, Example 4 (c). 1.14 Grams of insulin (19 %, calculated on A-chain material used) were obtained, comprising 22 to 24 I.U. per mg.

EXAMPLE 5

Human insulin a. A-chain S-tetrasulfonate (human) and
b. N$^\alpha$-Boc-Ala-B-chain S-disulfonate (human)

were prepared as disclosed in the cited copending Patent Application Example 5 a and b. Namely, preparation of the A-chain compound was analogous to Examples 1 a and 4 a. Yield upon synthesis: 55 percent; upon sulfitolysis: 33 percent.

Synthesis of the B-chain compound was analogous to Example 1 b. As the first amino acid, however, Boc—Thr—OH was esterified with the hydroxy groups of the resin. Yield: 62 percent.

When the reaction was complete, the B-chain was split off in known manner from the resin by means of hydrogen fluoride. Yield: 58 percent, calculated on the first amino acid Thr$^{B30}$. 3.6 grams (1 mmol) of the N$^\epsilon$ $^{B29}$-Pht-B-chain still S-protected were reacted in 100 ml of dimethylsulfoxide with 390 mg (1.2 mmols) of Boc-Ala-ONp in the presence of 135 mg of 1-hydroxy-benzotriazole during 1 hour at room temperature. After the solvent had been distilled off in vacuo until a volume of 10 ml remained and ethyl acetate had been added, 3.5 g of Boc-Ala-S-tert.-butyl-mercapto-N$^\epsilon$ -Pht-B-chain were obtained.

For splitting off the phthaloyl group, the compound was dissolved in 100 ml of 80 percent phenol and, after addition of 4 ml of hydrazine hydrate, the mixture was heated to 40°C. for 16 hours. 3.3 grams of the compound that had been freed from the phthaloyl group were then precipitated with 1 l of isopropanol/ether (1 + 5) and converted into the disulfonate as in Example 1 a.
Yield: 3.0 g.

As in Example 1 a, Ala may also be replaced by Gly in the B-chain S-disulfonate.

c. Human insulin

The pH-value of a solution of 2.8 g of the A-chain tetrasulfonate prepared according to a in 200 ml of dimethylsulfoxide was adjusted to 9 by adding N-ethylmorpholine, and the mixture was stirred with 2.8 g of the nitrophenyl ester prepared according to Example 1 (c,2). After 20 hours, the mixture was precipitated with ether/methanol (10:1), whereupon 2.6 g of mono-A-chain tetrasulfonate of di-Boc-ethylenediaminediacetic acid monotriphenyl ester (87 %) were obtained. The product was again taken up in 200 ml of dimethylsulfoxide, 3.0 g of the N$^\alpha$—Boc—Ala—B—chain disulfonate prepared according to Example 1 (b), 120 mg of 1-hydroxy-benzotriazole and some triethylamine (up to pH 9) were added, and the mixture was stirred for 6 hours at room temperature. The mixture was then precipitated with ether/methanol (10:1) and a yield of 5.43 g was obtained. The crude reaction product was taken up in 40 ml of trifluoroacetic acid. After 40 minutes, 5.0 g of the compound of the general formula I, wherein R stands for —CH$_2$—NH—CH$_2$—CH$_2$—NH—CH$_2$—, X for SO$_3^-$ and Y for Ala, were precipitated with 400 ml of ether.

The product was worked up as disclosed in Example 5 c of the cited copending Patent Application. Namely, the product was purified, reduced and dehydrogenated to yield cross-linked insulin derivative as in Example 1.

The residue was dissolved in 50 ml of 10 percent acetic acid and chromatographed by neans of a column having a size of 4 × 100 cm and containing "Sephadex G-50", superfine, or it was purified by distribution chromatography on "Sephadex LH-20" as in Example 1 d. The column had been calibrated with correspondingly cross-linked insulin. After a preliminary peak, the "insulin" peak appeared. The preliminary peak was reduced as in Example 1 and oxidized as above.

The crude insulin derivative obtained upon chromatography was subjected to Edman degradation as in Example 1.

After another purification operation by chromatography using "Sephadex G-75" as above, an insulin fraction was obtained which precipitated in an amorphous form in the usual manner after addition of ZnCl$_2$ and adjustment of the pH-value to 5.4, but crystallized in the course of 1 to 2 days. The crystals were cautiously separated from uncrystallized material by centrifuging and crystallization was repeated. 1.2 g of insulin (20 percent, calculated on A-chain material used) were obtained comprising 23 to 24 I.U. per mg.

EXAMPLE 6

B1-acetyl-human insulin a. S-tetra-tert.-butylmercapto-A-chain (human)

The protected A-chain was prepared.

b. N-acetyl-S-di-tert.-butylmercapto-B-chain (human)

The B-chain was prepared.

c. B1-acetyl human insulin

The pH-value of a solution of 2.8 g of the A-chain derivative prepared according to a in 200 ml of dimethylsulfoxide was adjusted to 9 by adding N-ethylmorpholine, and the mixture was stirred with 1.8 g of the nitrophenyl ester prepared according to Example 1 (c,4). After 20 hours, the mixture was precipitated with ether/methanol (10:1), whereupon 2.6 g of mono-A-chain tetrasulfonate of di-Boc-propylenediamine diacetic acid mononitrophenyl ester were obtained. The compound was taken up in 200 ml of dimethylsulfoxide, 2.9 g of the N$^\alpha$-acetyl-B-chain derivative prepared according to (b), 120 mg of 1-hydroxy-benzotriazole and some triethylamine (up to pH 9) were added, and the mixture was stirred for 6 hours at room temperature. The mixture was then precipitated with ethyl acetate and a yield of 5.40 g was obtained. The crude reaction product was taken up in 40 ml of trifluoroacetic acid. After 40 minutes, 5.0 g of the compound of the general formula I, wherein R is —CH$_2$—NH—CH$_2$—CH$_2$—NH—CH$_2$—, X is S-tert.-butylmercapto and Y is acetyl, were precipitated with 400 ml of ether.

The product was worked up.

1.2 Grams of insulin (20 %, calculated on A-chain material used) were obtained, which was B1-acetyl human insulin comprising 23 to 24 I.U. per mg.

What is claimed is:

1. A method for making an insulin compound of the formula

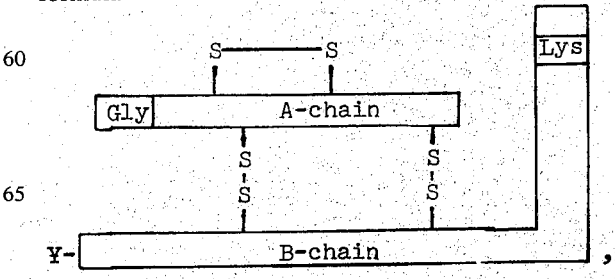

wherein Y is hydrogen, alkanoyl having 1 to 4 carbon atoms, phenyl-alkanoyl having 1 to 3 carbon atoms in the alkanoyl portion, benzoyl, alkyloxy-carbonyl or aralkyloxy-carbonyl having 1 to 4 carbon atoms in the alkyl portion, or aminoacyl derived from a naturally-occurring α-or β- amino acid or from the D-enantiomer thereof, and biologically-active analogs thereof in which one or more amino acids have been exchanged for other, preferably simpler, amino acids or in which the chains are modified, preferably shortened, in length, which process comprises cleaving N-protective and S-protective groups from a compound of the formula

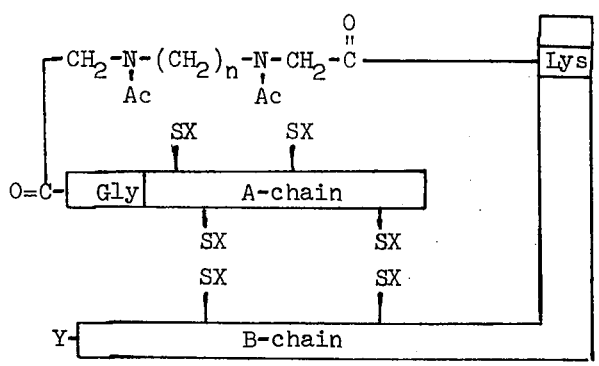

or analogs thereof in which one or more amino acids have been exchanged for other, preferably simpler, amino acids or in which the chains are modified, preferably shortened, in length wherein Ac is an N-protective group cleaved by proton solvolysis, X is hydrogen or an S-protective group, and $n$ is 2 or 3, dehydrogenating -SH groups in the resultant product to form S-S bonds, whereby a compound of the formula

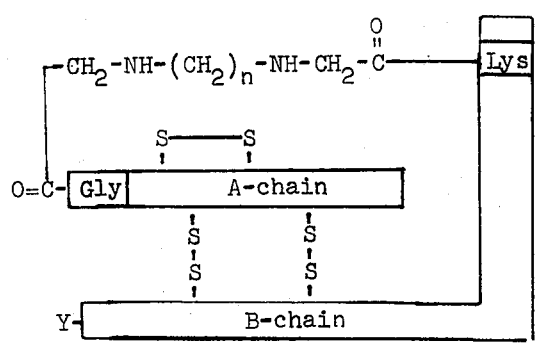

or an aforementioned analog thereof, is obtained, and then subjecting the last-mentioned compound or analog to Edman degradation to remove the

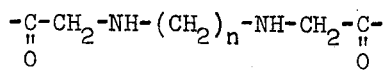

bridge therefrom.

2. An insulin compound of the formula

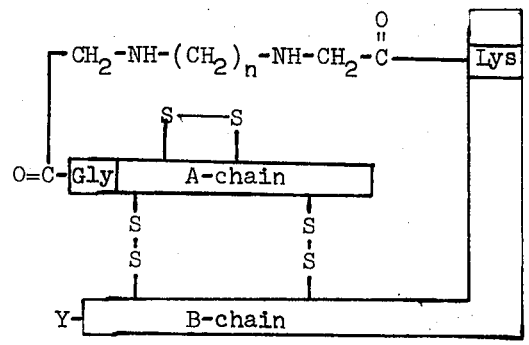

wherein $n$ is 2 or 3 and Y is hydrogen, alkanoyl having 1 to 4 carbon atoms, phenyl-alkanoyl having 1 to 3 carbon atoms in the alkanoyl portion, benzoyl, alkyloxy-carbonyl or aralkyloxycarbonyl having 1 to 4 carbon atoms in the alkyl portion, or aminoacyl derived from a naturally-occurring α- or β-amino acid or from D-alanine.

* * * * *